United States Patent
Nochimowski et al.

(10) Patent No.: US 8,230,128 B2
(45) Date of Patent: *Jul. 24, 2012

(54) MONITORING HOST ACTIVITY USING AN INTERRUPT

(75) Inventors: Alain Nochimowski, Tel Aviv (IL); Micha Rave, Herzliya (IL); Eitan Mardiks, Ra'anana (IL); Itzhak Pomerantz, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,556

(22) Filed: Dec. 9, 2010

(65) Prior Publication Data

US 2011/0078341 A1 Mar. 31, 2011

Related U.S. Application Data

(63) Continuation of application No. 12/127,650, filed on May 27, 2008, now Pat. No. 7,877,522.

(51) Int. Cl.
*G06F 3/00* (2006.01)
*H04W 36/00* (2009.01)

(52) U.S. Cl. .......... 710/15; 455/442

(58) Field of Classification Search ............ 710/15; 455/442

See application file for complete search history.

(56) References Cited

U.S. PATENT DOCUMENTS

| | | | |
|---|---|---|---|
| 5,712,180 A | 1/1998 | Guterman | |
| 5,847,996 A | 12/1998 | Guterman | |
| 5,883,409 A | 3/1999 | Guterman | |
| 5,910,915 A | 6/1999 | Guterman | |
| 6,002,152 A | 12/1999 | Guterman | |
| 6,185,652 B1 * | 2/2001 | Shek et al. | 710/263 |
| 6,664,587 B2 | 12/2003 | Guterman | |
| 6,704,222 B2 | 3/2004 | Guterman | |
| 6,861,700 B2 | 3/2005 | Guterman | |
| 6,954,381 B2 | 10/2005 | Guterman | |
| 7,071,060 B1 | 7/2006 | Guterman | |
| 7,313,421 B2 | 12/2007 | Dejanovic | |
| 2002/0086641 A1 | 7/2002 | Howard | |
| 2002/0143813 A1 | 10/2002 | Jellum et al. | |
| 2004/0213273 A1 | 10/2004 | Ma | |
| 2005/0015805 A1 | 1/2005 | Iwamura | |
| 2006/0020745 A1 | 1/2006 | Conley et al. | |
| 2006/0116127 A1 | 6/2006 | Wilhoite et al. | |
| 2009/0172276 A1 * | 7/2009 | Nochimowski et al. | 711/114 |

OTHER PUBLICATIONS

Welling, Girish et al. "An Architecture for Exporting Environment Awareness to Mobile Computing Applications," IEEE Transactions on Software Engineering, vol. 24, No. 5, May 1998, pp. 391-400.

Tierney et al., "A Network-Aware Distributed Storage Cache for Data Intensive Environments," Proceedings of the Eight International Symposium on High Performance Distributed Computing, 1999, pp. 185-193.

(Continued)

*Primary Examiner* — Hyun Nam (74) *Attorney, Agent, or Firm* — Toler Law Group, PC (57) ABSTRACT

A method of using a device, including monitoring host activity in an autonomous manner, without the host reporting to the device about its activity. The method also including initiating communications from the device and using resources of the host for such communications, thereby enabling the device to function as a proactive device.

20 Claims, 4 Drawing Sheets

OTHER PUBLICATIONS

Acharya et al, "Sumatra: A Language for Resource-Aware Mobile Programs," Mobile Object Systems Towards the Programmable Internet, 1997, pp. 111-130.

Reid et al., "Security Considerations for Conducted and Radiated Emissions," Proceedings Asia Pacific Symposium on EMC Taipei, APEMC 2005, pp. 345-348.

Zhang et al., "Workload Propagation—Overload in Bursty Servers," Second International Conference on the Quantitative Evaluation of Systems, Sep. 19-22, 2005, pp. 179-188.

Office Action dated Mar. 22, 2010 in U.S. Appl. No. 12/127,650.

Notice of Allowance dated Sep. 14, 2010 in U.S. Appl. No. 12/127,650.

* cited by examiner

MONITORING HOST ACTIVITY USING AN INTERRUPT

CROSS-REFERENCE TO RELATED APPLICATIONS

This application is a continuation of and claims priority under 35 USC 120 to U.S. patent application No. 12/127,650 now U.S. Pat. No. 7,877,522, filed May 27, 2008, and entitled "Method of Monitoring Host Activity," which is hereby incorporated herein by reference in its entirety and for all purposes.

The present invention relates generally to a method of monitoring host activity. More particularly, the invention relates to a method of using a device for monitoring host activity.

BACKGROUND OF THE INVENTION

The introduction of storage devices having enhanced features and capabilities present a storage device implemented to initiate communication with a host computer or with a remote server autonomously, without the host computer intervening to report to the storage device about its activity. As a result, a storage device activity may be performed independently from the host computer. Such enhanced features may influence the network, restrict the network bandwidth, and deteriorate the user experience.

Since a host computer (or a remote server) has no control over a storage device autonomous activity, the host computer has no means to monitor the storage device's activity. Thus, optimizing the usage of system resources is needed in order to reduce the load.

With current systems, monitoring the load of the system's resources is typically done by an application on the host. In such cases, the host monitors its processor activity in order to gather intelligence about the current or expected state of the network (for simplicity, a processor of any type may be referred to generically as a "CPU"). The host may further use the intelligence to control its network communications and manage the network system load. In other words, controlling the host network communications and other host activity is the exclusive responsibility of and is exclusively handled by the host.

However, the above approach is not practical in systems where a device, such as a storage device, utilizes the host resources autonomously for initiating communication with the host and/or a remote server.

SUMMARY OF THE INVENTION

In view of the foregoing observations and the present needs, it would be desirable to have a device, e.g., a storage device, which is capable of monitoring host activity. In the context of this description, "host activity" corresponds to CPU load in handling host network communications, and it may be independent of and unrelated to the device's activity and/or its communication. The exemplary embodiments provided herein relate to a device, such as a storage device, that is operative to monitor host activity and where the device does not utilize a mechanism that enables the host to report its activity to the device.

Embodiments, various examples of which are discussed herein, include a method of using a device that is operatively coupled to a host, including monitoring, in a device, host activity in an autonomous manner, without the host reporting to the device about its activity; and initiating communications from the device and using resources of the host for such communications, thereby enabling the device to function as a proactive device. The host activity may correspond to a CPU load of the host and/or to a network related activity of the host.

The monitoring may include monitoring radio frequency activity of the host. The radio frequency emission may be an indication of cellular activity, for example. Additionally or optionally, the monitoring may include monitoring a responsiveness of the host, monitoring a polling rate of the host and/or monitoring noise level on a power supply line of the device.

The method may further include regulating communication out of the device using the resources of the host, according to the monitored host activity. The method may further control operation of the device according to the monitored activity level and/or prompting the host, according to the monitored host activity, to provide a network link between the host and a network device that is external to the host.

The device may be a storage device having a control circuitry including a memory controller. As such, the monitoring may be performed by the control circuitry. The memory controller may control a flash memory and initiating communications may be performed by the memory controller for exchanging data with the flash memory.

In another embodiment of the foregoing approach, a device includes a controller that is operative to monitor host activity. The controller enables the device to function as a proactive device in initiating communications from the device and using resources of the host for such communications. The controller is further operative to monitor the host activity autonomously, without the host reporting to the device about its activity.

The host activity may correspond to a CPU load of the host, a network activity of the host, or a responsiveness of the host.

Additionally or optionally to the above, the controller may monitor radio frequency emission that is radiated from the host. The radio frequency emission may be an indication of cellular activity. The controller may monitor a polling rate of the host or a noise level on a power supply line of the device. The controller may be further operative to control operation of the device according to the monitored host activity. The controller may be operative to prompt the host, according to the monitored host activity, to provide a network link between the host and a network device that is external to the host.

The device depicted herein above may further include a non-volatile memory that is connectable to the controller, for storing data. The device may further include a learning mechanism that is connectable to the controller. The learning mechanism may be operative to teach itself to develop a database of information, according to the monitored host activity.

In another embodiment of the foregoing approach, a device includes means in the device for monitoring host activity in an autonomous manner, without the host intervening to report to the device about its activity. The means for monitoring host activity is operative to enable the device to function as a proactive device in initiating communications from the device and using resources of the host for such communications. The means for monitoring host activity is further operative to monitor the host activity autonomously, without the host reporting to the device about its activity.

Additional features and advantages of the embodiments described are possible as will become apparent from the following drawings and description.

BRIEF DESCRIPTION OF THE DRAWINGS

For a better understanding of the invention with regard to the various embodiments, reference is made to the accompanying drawings, in which like numerals designate corresponding sections or elements throughout, and in which.

DETAILED DESCRIPTION OF PREFERRED EMBODIMENTS

The embodiments and various aspects thereof are further described in more details below. This description is not intended to limit the scope of claims but instead to provide examples of such embodiments.

The following discussion therefore presents exemplary embodiments, which include a device, such as a storage device, configured for monitoring host activity and a method of using such storage device for monitoring host activity. Monitoring host activity may be utilized for controlling communication with the host, to thereby reduce loading of the host.

The device is a specialized device configured to function as a proactive device. In the context of the present invention, the term "proactive device" (or "proactive storage device") refers to any device, including a storage device, that initiates commands with a host independently of a host request/command, and which actively communicates with a host and/or a remote device using the resources of the host. A proactive device may be further operative in initiating communication with and/or being responsive, in performing an operation, to any other device that is not necessarily the host. In contrast to a slave-only device paradigm, where the master device (e.g., the host) is the only device that initiates a session/communication channel with the slave-only device, the proactive storage device is programmed to initiate communications with a host or with any other remote device using the host as a mediator.

With this capability, the storage device may 1) interact with other devices and/or storage devices present in the same host computer, 2) itself initiate the interactions using the processing resources and network interface of the host, and 3) interface with the end-user via the display or keyboard of the host.

Accordingly, the host (or host computer) of the exemplary embodiments is configured, either in software and/or hardware, with an implementation supporting a proactive storage device.

The exemplary embodiments can further pertain to an electronic system that includes a storage device as discussed above. Memory systems used to store digital data for use with various electronics products may, but need not necessarily, be configured as any dedicated, non-removable storage device that is embedded within a host (such as the 16-gigabyte (GB) iNAND embedded flash drive (EFD), available by SanDisk Corporation); or may be a removable storage device that is configured for removal from and addition to the host.

One type of removable storage device that is well suitable for use as a storage device is a memory card. Memory cards are commonly used to store digital data for use with various electronics products. The memory card is often removable from the electronic system so that the stored digital data is portable. The memory cards can have a relatively small form factor and can be used to store digital data for electronics products that acquire data, such as cameras, media players/recorders (e.g., MP3 devices), hand-held or notebook computers, personal digital assistants (PDAs), cellular phones, network cards, network appliances, set-top boxes, and hand-held or other devices.

Accordingly, the storage device of the exemplary embodiments may have a configuration that complies with any memory (e.g. flash memory), memory stick, and/or memory card format, such as a secured digital (SD) memory card format used for storing digital media such as audio, video, or picture files. The device may also have a configuration that complies with a multi media card (MMC) memory card format, a compact flash (CF) memory card format, a flash PC (e.g., ATA Flash) memory card format, a smart-media memory card format, or with any other industry standard specifications. One supplier of these memory cards is SanDisk Corporation.

The storage device may also have a configuration complying with a high capacity SIM (HCS) memory card format. The HCS memory card format is a secure, cost-effective and high-capacity storage solution for the increased requirements of multimedia handset, typically configured to use a host's network capabilities and/or other resources, to thereby enable network communication (see for example, the SIM application toolkit technology that provides a card for a proactive role with a handset).

The storage device may be a nonvolatile memory that retains its memory or stored state even when power is removed. The storage device may also apply to other erasable programmable memory technologies, including but not-limited to electrically-erasable and programmable read-only memories (EEPROMs), EPROM, MRAM, FRAM ferroelectric and magnetic memories. Note that the storage device configuration does not depend on the type of removable memory, and may be implemented with any type of memory, whether it be a flash memory or another type of memory. The storage device may also be implemented with a one-time programmable (OTP) memory chip and/or with a 3 dimensional memory chip technology.

Host systems with which such memory cards are used include cellular telephones, personal computers, notebook computers, hand held computing devices, cameras, audio reproducing devices, media players/recorders (e.g., MP3 devices), and other electronic devices requiring removable data storage. Flash EEPROM systems are also utilized as bulk mass storage embedded in host systems. The storage device may also be implemented on a PDA (Personal Digital Assistant), mobile handset, and other various electronic devices. A PDA is typically known as user-held computer system implemented with various personal information management applications, such as an address book, a daily organizer, and electronic notepads, to name a few.

Figure 1:
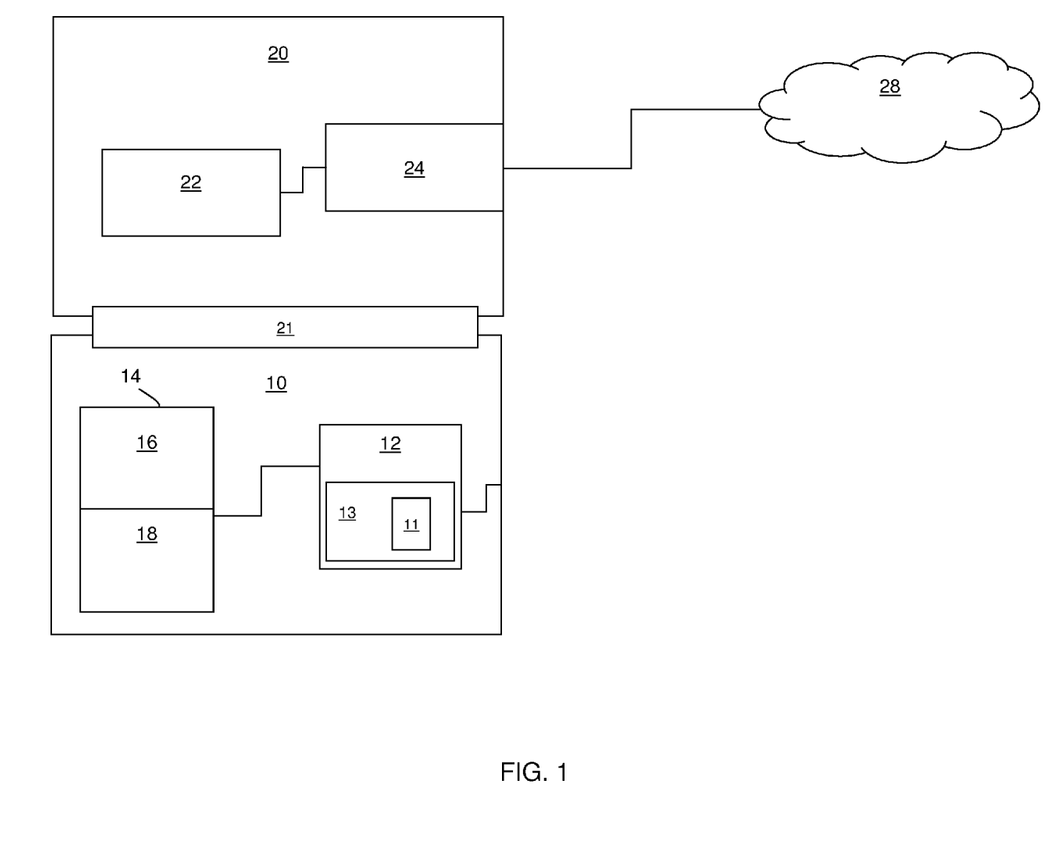
FIG. 1 is a block diagram of a storage device for monitoring host activity, according to one exemplary embodiment.

FIG. 1 is an exemplary block diagram of a storage device 10 for monitoring host activity, according to one embodiment. Storage device 10 is a proactive storage device configured to monitor host activity autonomously, without the host reporting to the storage device about its activity.

Communication between the storage device 10 and the host 20 can be via a host interface 21, or via any other communication channel known to those skilled in the art. As the storage device and the host are separate devices, the storage device and the host can be in communication with each other by way of an interface such as, for example, a socket into which the host and storage device are physically ported. In other cases, the storage device and the host can be in communication with each other over a wired or a wireless communication channel well known in the art.

The storage device 10 includes a controller 12 and storage array 14 coupled thereto. The storage array 14 can be configured as an array of memory cells (such as FLASH), capable of storing data in either a volatile or a non-volatile manner. Even though the storage array discussed herein is typically an array of FLASH memory cells, the exemplary embodiment is not limited to only FLASH type memory cells since it is contemplated that the exemplary embodiment can be used with any appropriate type of memory cell.

To this end, the storage device is configured with such monitoring capability. This monitoring capability is made possible by the storage device controller's 12 operational capability to execute software applications from within the storage device using processing resources that are made available by the storage device controller 12.

One way for implementing the storage device 10 as a proactive storage device is by configuring the storage array 14 to include a visible mass storage area 16 and a hidden, storage area 18. The visible mass storage area 16 is typically in communication with a host (and more specifically with a file system of a host). The hidden storage area 18 is configured to be in a communication link with the controller 12, while being "invisible" to the host, such that any data content, changes to data content or any other data exchange between the hidden storage area 18 (and/or a network 28) can be hidden from view of the host 20.

In the context of this description, the term "visible mass storage area" refers herein to any arrangement of blocks of data that is specified using logical block addressing (LBA). Each block can be, for example, on the order of 512 or 1024 bytes each. In this context, the visible mass storage area 16 can be managed by a host using block commands consistent with LBA architecture and can be compatible with any contemplated visible mass storage architectures. Note that having FLASH type memory cells is not meant as a limitation, as other embodiments using any appropriate type of memory cell are further applicable.

Note that the storage array need not necessarily have a visible mass storage area and a hidden storage area, since any other implementations for providing a proactive storage device are also applicable.

The controller 12 includes a CPU 22 which is active in handling host communications. The controller 12 is operative to monitor this host CPU activity and then to control operation of the storage device 10 according to the monitored CPU activity. The controller 12 monitors the host activity autonomously, without the host reporting to the storage device about its activity. The monitored host activity corresponds to the processing load (e.g., CPU load) of the CPU 22 of the host 20 and/or the network activity of the host 20.

For example, if the monitored host activity indicates the host CPU activity is high, the controller 12 may delay an operation that utilizes the resources of the host to a later time. Controlling operation of the storage device 10 as such may prevent overloading the CPU of the host, alleviate the network congestion via a network interface 24 and optimize the end user's experience.

One implementation utilizes host polling, to thereby monitor the responsiveness of the host. Host polling is taught in U.S. application Ser. No. 12/029,356 to Nochimowski et al. According to the host polling mechanism, the host continuously polls the storage device 10 with a command at constant predefined time intervals. The controller 12 may respond to the command with a data transaction request and measure the duration of time until the data transaction request is handled by the host.

The implementation of such a host polling mechanism can be utilized for measuring and/or monitoring the responsiveness of the host. The duration of time since the storage device 10 responds with a data transaction request until the host handles the data transaction request is defined as a measure of the responsiveness of the host. Since the time for handling of a data transaction request by the host is proportional to the host activity, monitoring the responsiveness of the host provides the storage device 10 with an indication of the host activity.

Note that the host polling is independent of and unrelated to any host initiated or host file system initiated process. Accordingly, the polling rate of the host may be independent of and unrelated to any host-initiated or host file system-initiated process. It should be also noted that the described polling process is not conditioned upon the need or the expectation of the host for a specific response from the storage device 10.

Since the storage device 10 may be connected to different types of hosts having different response times, the controller 12 may be implemented with a self-learning mechanism 13 that teaches or trains itself to develop a database of information (such as a log file 11) for future control of the storage device. Such information can be further used for a variety of purposes, including conveying information associated with the host activity to an external device, etc. One exemplary self-learning process for monitoring responsiveness of the host is depicted by the flow chart 50 in FIG. 4.

Accordingly, the controller 12 may control operation of the storage device 10 according to the monitored host activity and based on the information stored in the log file 11.

With the host 20 being in communication with the network 28, the storage device 10 may further prompt the host 20 to provide a network link between the host 20 and the network 28 (that is external to the host), according to the monitored host activity. As such, the storage device 10 regulates network communication out of the storage device 10 via the resources of the host 20 according to the monitored host activity. Regulating network communication via the host may be particularly required in a resource-constrained environment as the mobile-networked system of the host.

Configuring a storage device, having a visible mass storage area and a hidden storage area, for establishing network communication via a host, is taught in U.S. application Ser. No. 12/029,356 to Nochimowski et al.

Figure 2:
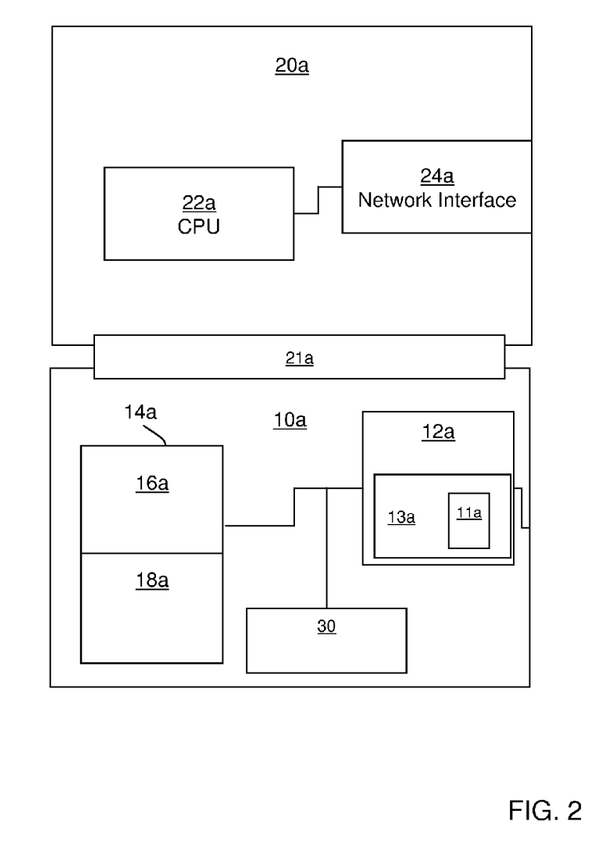
FIG. 2 is a block diagram of a storage device for monitoring host activity, according to a second exemplary embodiment.

FIG. 2 is a block diagram of a storage device 10a according to another example embodiment. Storage device 10a includes components identical to those of storage device 10, including a host interface 21a; a storage array 14a having a visible mass storage area 16a and a hidden storage area 18a; and a controller 12a having a self-learning mechanism 13a which stores a log file 11a.

An RF detector 30 is provided for monitoring radio frequency (RF) emission radiated from the host. The RF detector 30 monitors RF activity autonomously without the host intervening to report to the storage device 10a about its activity. The radio frequency (RF) emission radiated from the host may be an indication of cellular emission. Again, the controller 12a, connected to the RF detector 30, is operative to control operation of the storage device 10a according to the monitored host activity.

The storage device 10a may further monitor and analyze signals radiated from the host. The non-limiting embodiment shown here is applicable to monitor radio frequency emission radiated from the host. One way for monitoring these signals may be by monitoring the magnitude of the network activity for example.

Note that implementing RF detector 30 within the controller 12a is also applicable. Also note that any combination of the arrangements of FIG. 1 and FIG. 2 is also possible.

Figure 3:
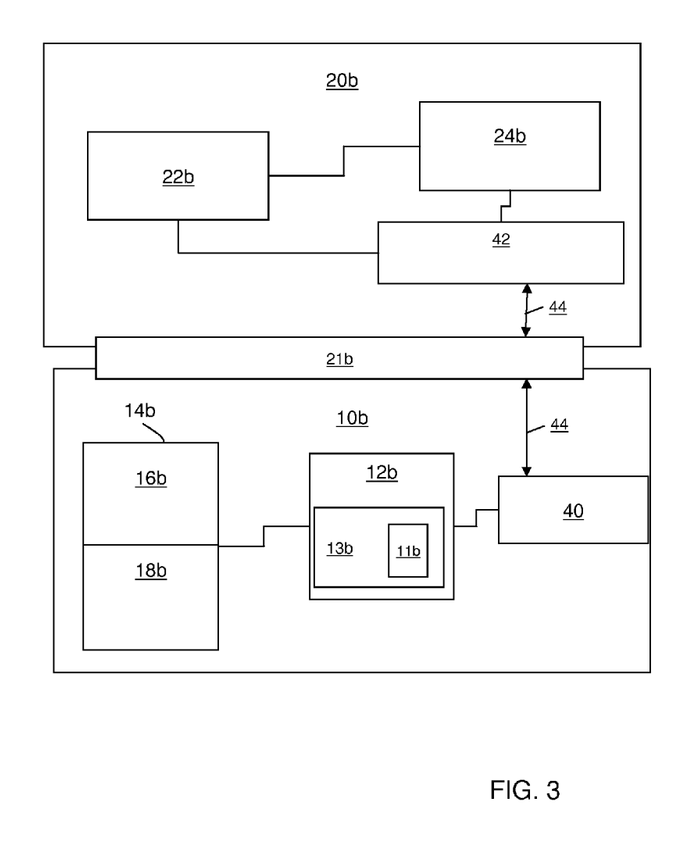
FIG. 3 is a block diagram of a storage device for monitoring host activity, according to a third exemplary embodiment.

FIG. 3 is a block diagram of a storage device 10b according to another exemplary embodiment. Storage device 10b includes components identical to those of storage device 10, including a host interface 21b; a storage array 14b having a visible mass storage area 16b and a hidden storage area 18b; and a controller 12b having and a self-learning mechanism 13b storing a log file 11b.

Host 20b includes components identical to those of host 20, including a CPU 22b and a network interface 24b. Host 20b further includes a host power supply unit 42 for supplying the host with power.

A power supply line 44 is provided to connect the storage device 10b with the host power supply unit 42. A noise sensing circuitry 40, residing in the storage device 30 and connected to the controller 12b, monitors the noise level on the power supply line 44. With the power supply line 44 connected directly to the host power supply unit 42 of the host 20b, the noise level is proportional to the host activity. For example, if the CPU 22b of the host 20b is idle then the noise level that is monitored on the power supply line 44 is minimal, whereas if the CPU 22b is operating at a higher processing level then the noise level that is monitored is higher accordingly. Again, the controller 12b, connected to the noise sensing circuitry 40, is operative to control operation of the storage device 10b according to the monitored host activity.

Note that implementing noise sensing circuitry 40 within the controller 12b is also applicable. Also note that combination of the arrangements of FIG. 3 and FIG. 2, and of FIG. 3 and FIG. 1 are also possible.

Figure 4:
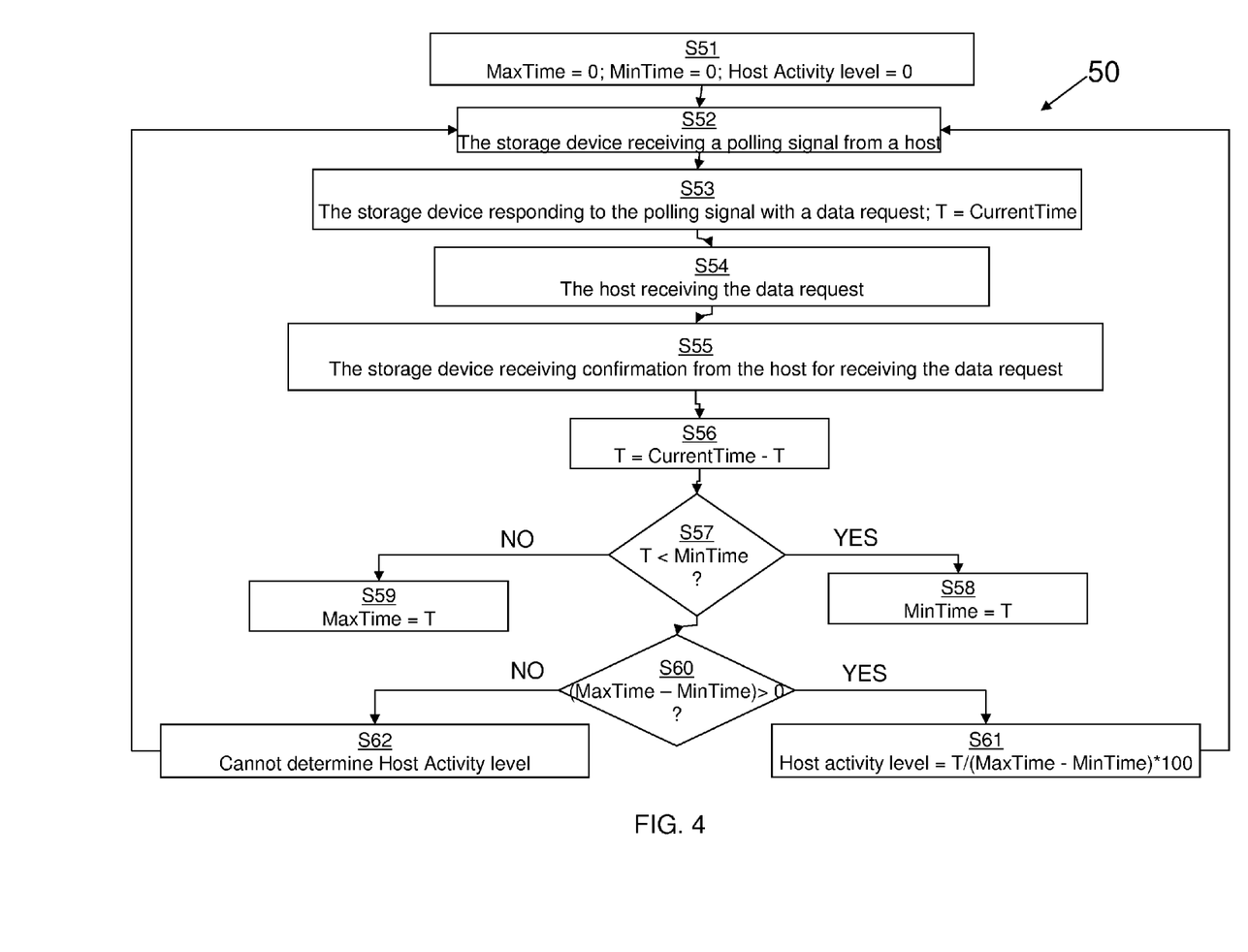
FIG. 4 is a flow chart of a method a self-learning mechanism for monitoring the responsiveness of the host, according to one example embodiment.

FIG. 4 is a flow chart of a method 50 representing a self-learning mechanism for monitoring the responsiveness of the host, according to one embodiment. The method of this embodiment utilizes the host polling mechanism, where the host is continuously polling the storage device.

The method begins at S51, where a set of parameters MaxTime, MinTime and Host Activity Level are set to zero.

Next, the storage device receives a polling signal from the host (S52), and responds to this polling signal with a data request while setting the value of a parameter T to be the current time (S53). The storage device makes use of the polling signal that is received from the host for monitoring the responsiveness of the host. As such, the storage device is capable of monitoring host activity without the host reporting to the storage device about its activity. The storage device is able to respond to this polling signal and to further regulate communication out of the storage device using the resources of the host since, as noted above, the storage device functions as a proactive storage device in initiating communications from the storage device and using the resources of the host for such communications. Note that employing a polling mechanism for monitoring host activity as such is provided as a mere example. Additionally or alternatively, the storage device may monitor a responsiveness of the host according to other ways known in the art (e.g., by monitoring the duration of time until the host receives a response for a corresponding issued request.

After the host receives the data request (S54) and the storage device receives a confirmation for this from the host (S55), the storage device sets the value of the parameter T to be the difference between the current time and T (S56).

Then at S57, the storage device determines whether the value of the parameter T is less than the value set for the parameter MinTime. In the affirmative case (i.e., T<MinTime), then MinTime is set to T (S58). If the value of T is not less than the value of MinTime, then MaxTime equals T (S59).

Then at S60, the storage device determines whether the value obtained from the difference between MaxTime and MinTime is larger than zero. In the affirmative case (i.e., MaxTime−MinTime>0), then the storage device sets the Host Activity Level parameter to be T divided by the difference between MaxTime and MinTime (S61), and the storage device returns to step S52 and waits for a new polling signal to be received from the host. The storage device may multiply the value of the Host Activity level parameter by 100 to provide an indication of the host activity level in percentage. Now, the value of the Host Activity Level parameter corresponds to the responsiveness of the host.

If the difference between the values of the parameters MaxTime and MinTime is not larger than zero, then the storage device can not determine an indication of the host activity at this point (S62) and the storage device returns to step S52 and waits for receiving a new polling signal from the host.

Although the exemplary method described herein utilizes the host polling process to monitor the responsiveness of the host and obtain an indication of the host activity, other embodiments are also applicable. For example, monitoring the responsiveness of the host may be achieved by the storage device raising an interrupt, prompting the host to execute a requested process. The duration of time since the interrupt was issued by the storage device and until the requested process is handled by the host may correspond to the responsiveness of the host. Hence, monitoring the host activity may include prompting the host to execute a requested process by associating a testing message with an interrupt and raising the interrupt.

According to another example, the monitoring of the host activity may include monitoring radio frequency (RF) emissions radiated from the host, including cellular emissions and wireless fidelity emissions. According yet to another example, monitoring the electromagnetic field created by the change of current flow through a power supply line of the storage device provides an indication of the host activity. According to this example, the monitoring of the host activity includes monitoring the noise level on a power supply line of the storage device.

Although the exemplary storage device discussed herein is configured as a proactive storage device to initiate communication with a remote device via the host, it should be noted that the storage device of the exemplary embodiments may be essentially symmetric in that any circuit or software application external to the storage device can originate a request having the storage device as its target. In this way, the storage device can respond to the requests that originate from external circuits or external software applications.

As will be appreciated by those familiar in the art, current storage devices employ a wide variety of different architectures and it is expected that new architectures will continue to be developed. In general, the exemplary embodiments may be employed in conjunction with a wide variety of different types of memory, so long as the storage device being used has suitable processing power.

The embodiments, various examples of which are described herein, may be realized in hardware, software, firmware or any combination thereof. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the embodiments described herein, and which, when loaded in a computer system is able to carry out these embodiments. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Having described the various embodiments of a storage device and a method, it is to be understood that the description is not meant as a limitation, since further modifications will now suggest themselves to those skilled in the art, and it is intended to cover such modifications as falling within the scope of the appended claims.

The invention claimed is:

1. A method of operating a memory card, the method comprising:
   receiving power from a host device;
   sending information from the memory card to the host device, wherein the memory card is useable as a storage device by the host device, and wherein the host device includes a central processing unit (CPU), a network communication interface and a power supply line to supply power to the memory card;
   sending an interrupt to the host device that prompts the host device to execute a requested process to determine a level of host device activity;
   in response to the interrupt, receiving a reply from the host device indicating the requested process has been handled by the host device;
   determining the level of host device activity based upon a duration of time between when the interrupt is issued and the requested process is handled by the host; and
   based upon the determined level of the host device activity, requesting the host device to provide a communication link via the network communication interface to communicate with a remote device different from said host device.

2. The method of claim 1, further comprising regulating communication out of the memory card using resources of the host device, according to the determined level of the host device activity.

3. The method of claim 1, wherein the host device activity corresponds to a CPU load of the host device.

4. The method of claim 1, wherein the host device activity corresponds to a network related activity of the host device.

5. The method of claim 1, wherein the determining includes determining a responsiveness of the host device, wherein the responsiveness is correlated to a current CPU load of the CPU.

6. The method of claim 1, wherein the determining includes determining a noise level on the power supply line of the host device, wherein said noise level is correlated to a current CPU load of the CPU.

7. The method of claim 1, further comprising controlling operation of the host device according to the determined level of the host device activity.

8. The method of claim 1, wherein the memory card comprises control circuitry including a memory controller, and wherein the determining is performed by the control circuitry.

9. The method of claim 8, wherein the memory controller controls a flash memory.

10. The method of claim 8, further comprising delaying the requesting when the level of the host device activity is determined to be high.

11. The method of claim 8, wherein the memory controller is further designed or configured to determine a noise level on the power supply line of the host device, wherein said noise level is correlated to a current CPU load of the CPU.

12. The method of claim 1, further comprising receiving a polling signal from the host device; in response to the polling signal, sending a data request to the host device; receiving a confirmation of the data request from the host device and determining the level of host device activity based upon a difference in time between when the data request is sent and when the confirmation is received.

13. A memory card comprising:
   a memory;
   a communication interface to communicate with a host device; and
   a controller coupled to the memory, the communication interface and a power supply line, said controller configured to: send information from the memory card to the host device via the communication interface, wherein the memory card is useable as a storage device by the host device, and wherein the host device includes a central processing unit (CPU), the power supply line that supplies power to the memory card, and a network communication interface separate from the memory card; send an interrupt to the host device that prompts the host device to execute a requested process to determine a level of host device activity; in response to the interrupt, to receive a reply from the host device indicating the requested process has been handled by the host device; determine the level of host device activity based upon a duration of time between when the interrupt is issued and the requested process is handled by the host; and based upon the determined level of the host device activity, requesting the host device to provide a communication link via the network communication interface to communicate with a remote device different from said host device.

14. The memory card of claim 13, wherein the controller is further configured to determine a responsiveness of the host device, and wherein the responsiveness is correlated to a load of the CPU.

15. The memory card of claim 14, wherein the controller is further configured to receive a polling signal from the host device; and in response to the polling signal, to send a data request to the host device; to receive a confirmation of the data request from the host device and to determine the level of host device activity based upon a difference in time between when the data request is sent and the confirmation is received.

16. A non-transitory computer readable medium to store computer code executable by a controller in a memory card configured to receive power from a host device, the computer readable medium comprising:
   computer code to send information from the memory card to the host device, wherein the memory card is useable as a storage device by the host device, and wherein the host device includes a central processing unit (CPU), a network communication interface and a power supply line to supply power to the memory card;
   computer code to send an interrupt to the host device that prompts the host device to execute a requested process to determine a level of host device activity;
   computer code for, in response to the interrupt, receiving a reply from the host device, the reply indicating the requested process has been handled by the host device;

computer code to determine the level of host device activity based upon a duration of time between when the interrupt is sent and when the reply is received; and computer code for, based upon the determined level of the host device activity, requesting the host device to provide a communication link via the network communication interface to communicate with a remote device different from said host device.

17. The non-transitory computer readable medium of claim 16, further comprising:

computer code to receive a polling signal from the host device;

computer code to, in response to the polling signal, send a data request to the host device and to receive a confirmation of the data request from the host device; and computer code to determine the level of host device activity based upon a difference in time between when the data request is sent and the confirmation is received.

18. The non-transitory computer readable medium of claim 17, wherein the determining the level of the host device activity includes determining a noise level on the power supply line of the host device, wherein said noise level is correlated to a load of the CPU.

19. The non-transitory computer readable medium of claim 18, further comprising computer code to control operation of the host device according to the determined level of the host device activity.

20. The non-transitory computer readable medium of claim 18, further comprising computer code to delay requesting the host device to provide the communication link when the level of the host device activity is determined to be high.

* * * * *